United States Patent [19]

Sterr

[11] Patent Number: 5,496,664
[45] Date of Patent: Mar. 5, 1996

[54] PROCESS FOR PRODUCING A POSITIVE ELECTRODE FOR LITHIUM SECONDARY BATTERIES

[75] Inventor: Gerhard Sterr, Kelkheim, Germany

[73] Assignee: Varta Batterie Aktiengesellschaft, Hanover, Germany

[21] Appl. No.: 287,642

[22] Filed: Aug. 9, 1994

[30] Foreign Application Priority Data

Aug. 18, 1993 [DE] Germany ............ 43 277 760.8

[51] Int. Cl.$^6$ .................................................. H01M 4/50
[52] U.S. Cl. .................................................... 429/224
[58] Field of Search .................. 429/224; 423/599, 423/605

[56] References Cited

U.S. PATENT DOCUMENTS

| | | | |
|---|---|---|---|
| 4,133,856 | 1/1979 | Ikeda et al. | 264/63 |
| 4,788,372 | 11/1988 | Gaffney | 585/500 |
| 4,980,251 | 12/1990 | Thackeray et al. | 429/224 |
| 5,266,299 | 11/1993 | Tarascon | 423/599 |

FOREIGN PATENT DOCUMENTS 4169065  6/1992  Japan .

*Primary Examiner*—Prince Willis, Jr.
*Assistant Examiner*—Richard H. Lilley, Jr.
*Attorney, Agent, or Firm*—Weiser & Associates

[57] ABSTRACT

An active material for a positive electrode for lithium secondary batteries and composed of a lithium-manganese oxide ($Li_xMn_2O_4$) with a spinel structure is produced by mixing manganese dioxide with lithium formate (HCOOLi) and/or lithium acetate ($CH_3COOLi$), heating the resulting mixture for 10 to 100 hours, preferably at a temperature of from 600° C. to 750° C., and if necessary, grinding the heated mixture. The constituents of the mixture contain manganese and lithium in a molar ratio (Mn:Li) of 2:x, where 0.5<x<1.5. The resulting product has an extremely fine crystallinity and exhibits good cycling stability.

6 Claims, No Drawings

PROCESS FOR PRODUCING A POSITIVE ELECTRODE FOR LITHIUM SECONDARY BATTERIES

BACKGROUND OF THE INVENTION

The present invention generally relates to a process for producing a positive electrode for lithium secondary batteries, particularly those with an active material composed of a lithium manganese oxide having a spinel structure.

Lithium-manganese spinels are presently advantageously used as positive electrode material in electrochemical cells of the $Li/Li_xMn_2O_4$ type. The charge/discharge mechanism of such cells is based on the capacity of the manganese oxide to reversibly intercalate and deintercalate active $Li^+$ ions in its spinel lattice, which forms an open skeletal structure. Consequently, x will vary in parallel with progressive charging or discharging.

To prepare a $LiMn_2O_4$ material from $MnO_2$, one usually begins with a commercially available manganese dioxide which is first thoroughly ground in a mortar with a solid lithium compound, such as lithium hydroxide, lithium carbonate or lithium iodide, and which is then heated for the purpose of sintering. The sinter cake may optionally be comminuted and provided with a conductive agent (graphite) and a binder before it is press-molded to form the finished cathode pellet.

The commercially available manganese oxides (manganese blacks) form a suitable starting material for the preparation of lithium-manganese spinels insofar as they have for a long time been used in the battery industry, their electrochemical behavior has been thoroughly researched, they are an inexpensive raw material and they are environmentally compatible. However, such cathode substances, produced in the manner described, have to date continued to suffer from a lack of adequate cycling stability. The dischargeable capacities of such substances decrease noticeably in the course of their cyclic service life, in particular after a prior high-temperature aging.

Various measures have been proposed for stabilizing the host structure of a manganese spinel. To this end, it has been attempted to substitute some of the manganese in the lattice with foreign metals including Co, Ni and Fe. Japanese Published Specification 4-169065 suggests the production of a positive electrode material for lithium batteries from $MnO_2$ and lithium salts of formic acid and acetic acid, which are mixed with the manganese oxide (instead of $LiOH·H_2O$ or $Li_2CO_3$). The mixture is then heat-treated at relatively low temperatures of between 200° C. and 500° C. However, in each case, an unqualified success has not resulted.

SUMMARY OF THE INVENTION

It is therefore the primary object of the present invention to provide a process for producing a lithium-manganese spinel of the $Li_xMn_2O_4$ type which is cyclically stable as a cathode material in lithium cells containing organic electrolytes, and which is suitable as a counterelectrode to a negative lithium intercalating electrode (Li in a carbon matrix), even in systems where lithium is intercalated in both electrodes (i.e., so-called "SWING" systems).

These and other objects which will be apparent are achieved in accordance with the present invention by a process for producing an active material for a positive electrode for lithium secondary batteries, where the active material is composed of a lithium manganese oxide having a spinel structure, which process includes mixing manganese dioxide with lithium formate and/or lithium acetate, heating the resulting mixture to a temperature of from 550° C. to 800° C. for between 10 and 100 hours, and if necessary, grinding the heated mixture.

For further discussion of the process of the present invention, reference is made to the following detailed description.

DETAILED DESCRIPTION OF PREFERRED EMBODIMENTS

Initially, in a first step, pure manganese oxide is intimately mixed with lithium formate (HCOOLi) or lithium acetate ($CH_3COOLi$), or optionally, with both of these salts.

The manganese dioxide which is preferably used for such purposes is commercially prepared by a chemical reaction, usually by precipitation from a manganese salt solution. Such products are commercially available as "chemical" manganese dioxide (CMD). However, pure $\beta$-$MnO_2$, which occurs naturally as pyrolusite, is also suitable as a starting material.

The foregoing constituents are mixed in quantitative proportions that achieve a molar ratio of manganese to lithium of 2:x, where $0.5<x<1.5$, and preferably $0.9<x<1.2$. A particularly intimate mixing is obtained if a suspension of manganese black is produced in an aqueous solution of the appropriate lithium salts and the resulting solution is then subjected to spray drying.

The mixture obtained (in the latter case, the dry residue obtained) is heated in air at a temperature of from 550° C. to 800° C., and preferably from 600° C. to 750° C., for between 10 and 100 hours. Resulting from the vigorous gas evolution accompanying the reaction of the mixture's components, this thermal treatment produces an extremely finely crystalline lithium-manganese spinel. The small particle size of this preparation corresponds to a relatively large BET surface area (i.e., in excess of 5 $m^2/g$). This, in turn, imparts good high-current properties to the manganese spinel produced in accordance with the present invention.

The product is then ground, if necessary, and processed to produce the desired electrode. This grinding step can be performed either concurrently with the heating and mixing steps, or if desired, at a later stage in the manufacturing process.

The active electrode material which results meets the requirement of good cycle stability in batteries having positive $LiMn_2O_4$ electrodes and negative Li or Li-intercalating electrodes. The resulting active electrode material is also notable for high-temperature stability, and is therefore even suitable for use in galvanic solid-electrolyte cells which are operated in temperature ranges above room temperature.

The capacity to dope the resulting lithium-manganese spinels with lithium, to a level far beyond the stoichiometric composition (not more than x=1.5), is also extremely advantageous. This is especially so relative to the production of cells having positive and negative lithium-intercalating electrodes (i.e., SWING systems).

When finally assembled and in a sealed state, the electrodes of the resulting cells are usually uncharged (i.e., all available lithium is incorporated in the positive spinel or metal oxide electrode, while the host structure of the negative electrode is drained of lithium). During the first charging cycle, lithium is discharged from the positive host lattice and incorporated into the negative host lattice, which is preferably a carbon matrix. Some of the lithium is now retained by the carbon matrix to form a covering layer (i.e., by an irreversible chemical reaction). In this way, a certain quantity of lithium is withdrawn from the intercalation mechanism (by the carbon material, which is not inert from the outset). However, a lithium-manganese spinel made with a hyper-stoichiometric amount of lithium makes it possible to saturate the reactivity of the carbon electrode, so that the intercalation and deintercalation of lithium in the carbon matrix can proceed virtually without loss, i.e., reversibly.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. A process for producing an active material for a positive electrode for lithium secondary batteries, wherein the active material is composed of a lithium-manganese oxide having a spinel structure, and comprising the steps of:

mixing manganese dioxide with a lithium salt selected from the group consisting of lithium formate, lithium acetate, and combinations thereof, thereby producing a mixture; and heating the mixture at a temperature of from 600° C. to 750° C. for between 10 and 100 hours;

wherein the mixture is produced by spray-drying a suspension of the manganese dioxide in an aqueous solution of the lithium salt.

2. The process of claim 1 which further includes the step of grinding the heated mixture.

3. The process of claim 1 wherein the manganese dioxide is a chemically produced product (CMD) or a $\beta$-$MnO_2$ (pyrolusite).

4. The process of claim 1 wherein the manganese dioxide is mixed with both lithium formate and lithium acetate.

5. The process of claim 1 wherein the mixture contains manganese and lithium in a molar ratio of manganese to lithium of 2:x, where $0.5<x<1.5$.

6. The process of claim 5 where $0.9<x<1.2$.

* * * * *